H. S. Frost
Animal Trap

No. 120,375.                                   Patented Oct. 31, 1871.

Witnesses:                                     Inventor
W. C. Raymond                                  H. S. Frost by
Emma Greenaway                                 H. W. Beadle, Atty.

UNITED STATES PATENT OFFICE.

HENRY S. FROST, OF WATERTOWN, CONNECTICUT.

IMPROVEMENT IN ANIMAL-TRAPS.

Specification forming part of Letters Patent No. 120,375, dated October 31, 1871.

*To all whom it may concern:*

Be it known that I, HENRY S. FROST, of Watertown, in the county of Litchfield and State of Connecticut, have invented a new and useful Improvement in Animal-Traps; and I do hereby declare that the following is a full and exact description of the same, reference being had to the accompanying drawing and to the letters of reference marked thereon.

This invention relates to that class of animal-traps which is provided with spring-jaws actuated, when the trap is set, by a swinging or tilting bait-plate or platform; and consists in certain details of construction which will be fully described hereinafter.

Figure 1:
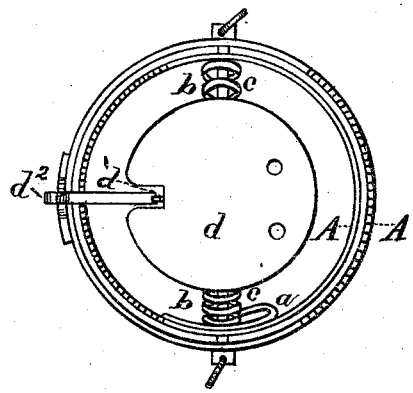
Figure 2:
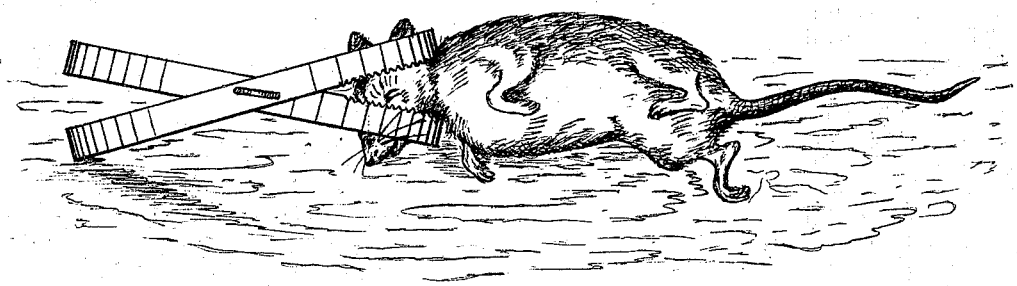

In the drawing, Figure 1 represents a plan view of the trap as set, and Fig. 2 a side elevation of the trap when sprung.

To enable others skilled in the art to make and use my invention, I will now proceed fully to describe its construction and manner of operation.

A A represent a pair of rings of similar form, one of which fits snugly within the other, as shown. They are centrally pivoted together by means of a transverse bar, $b$, upon which is located a spiral spring, $c$, one end of which is rigidly attached to the bar $b$ and the other to the arm $a$ extending from the inner ring, as shown. The outer ring is fixedly attached to the bar $b$ by means of a square shank and socket. $a'$ represents a stop, located upon the inner ring for the purpose of limiting its movement in either direction. $d$ represents the bait-plate or platform, which is constructed in any suitable manner and attached to the inner ring by means of an elbow, $d^1$, the latter being united to the projection upon the inner ring by means of a pivot-pin, as shown. The outer ring is provided with a trigger-arm, $d^2$, the front end of which rests in a notch in the upper end of the elbow $d^1$ when the trap is set. The adjacent faces of the rings upon the side which opens are serrated, as shown.

The operation is as follows: The trap is set by causing the inner ring to describe a half revolution within the outer, by which operation the serrated portions of the rings are separated and caused to assume a position upon opposite sides of the circle described by the trap. In this position the spring of course has a tendency to close the jaws together, but is held from doing so by means of the trigger-arm, which rests in the notch of elbow of the bait-platform. The trap is sprung in the usual well-known manner by depressing the bait-platform.

The advantage, however, obtained by this peculiar construction is that the action of the rings by the spring causes the trap to bound upward from its position as it closes, so that the capture of the animal is absolutely certain. The bounding action is occasioned by the forcible contact of the rings as they close with the floor or other support.

Having thus fully described my invention, what I claim as new, and desire to secure by Letters Patent, is—

1. An animal-trap provided with means for violently striking its support, when sprung, for the purpose of producing a bounding action, substantially as described.

2. A trap provided with a pair of rings actuated by a spring, substantially as described.

3. The trap described, consisting of the rings A A, bar $b$, spring $c$, and bait-platform $d$, the parts being combined substantially as described, for the purpose set forth.

This specification signed and witnessed this 13th day of April, 1871.

H. S. FROST.

Witnesses:
A. N. WOOLSON,
JAMES L. LOVELAND.

(143)